United States Patent [19]

Gupta et al.

[11] Patent Number: 4,942,026

[45] Date of Patent: Jul. 17, 1990

[54] NOVEL SYNTHESIS OF SODIPOTASSIC COPPER TUBE SILICATES

[75] Inventors: Balaram Gupta, N. Plainfield; Cheng K. Saw, Summit, both of N.J.; Malcolm E. Kenny, Cleveland Heights; Bruce A. Harrington, Cleveland, both of Ohio

[73] Assignee: Hoechst Celanese Corporation, Somerville, N.J.

[21] Appl. No.: 349,687

[22] Filed: May 10, 1989

[51] Int. Cl.$^5$ ............... C01B 33/20; C01B 33/32; C04B 35/16

[52] U.S. Cl. ............... 423/326; 423/332; 423/333; 423/334; 501/154

[58] Field of Search ............... 423/326, 332, 333, 334; 501/154

[56] References Cited

U.S. PATENT DOCUMENTS 3,497,462 2/1970 Kruerke ............... 252/454
3,836,633 9/1974 Beschke ............... 423/326
3,936,383 2/1976 Daimon et al. ............... 252/63

OTHER PUBLICATIONS

Chemical Abstracts, vol. 88, No. 24, 181619u. A New Type of Hydrated Crystalline Silica.
Chemical Abstracts, vol. 88, No. 14, 92347m. The synthesis and the Formula of Litidionite.
Chemical Abstracts, vol. 95, No. 24, 206959g. Crystallochemistry and Thermochemistry of Sodipotassic Copper Silicate.
Chemical Abstracts, vol. 97, No. 24, 198589t. Fibrous Organosilicon Polymers Derived from Silicates.
Kawamura et al.; "Crystallochemistry and Thermochemistry of Sodipotassic Copper Silicate", Bull. Mineral 104, pp. 387–395 (1981).
Hefter et al.; "Synthesis of the Tube Silicate Litidionite . . . " Inorg. Chem., vol. 21, pp. 2810–2816 (1982).
Hamilton et al.; "The Preparation of Silicate Compositions by a Gelling Method", Dept. of Geology, The University, Manchester 13, Jun. 6, 1968.
Goodwin et al.; "From Silica to Methylsiloxanes—A New Route", Polym. Prepr. Am. Chem. Soc., Div. Polym. Chem., vol. 27, p. 107 (1986).

Primary Examiner—Robert L. Stoll
Assistant Examiner—Lori F. Cuomo
Attorney, Agent, or Firm—Nixon & Vanderhye

[57] ABSTRACT

Sodipotassic copper tube silicate species of the family $Na_{2-2x}K_{2x}CuSi_4O_{10}$ are synthesized by combining, with an organo silicate at essentially room temperature, stoichiometric amounts of a copper salt, and at least one salt of potassium and sodium, in an aqueous alcohol solution to form a gel. The gel is then sintered at elevated temperature and for a time sufficient to form a crystalline specie of $Na_{2-2x}K_{2x}CuSi_4O_{10}$.

17 Claims, No Drawings

NOVEL SYNTHESIS OF SODIPOTASSIC COPPER TUBE SILICATES

FIELD OF THE INVENTION

The present invention relates to novel synthesis of sodipotassic copper tube silicate species of the familiy having the general formula $Na_{2-2x}K_{2x}CuSi_4O_{10}$. More specifically, the invention relates to synthesis of such sodipotassic copper tube silicates by forming a gel at room temperature, and then subjecting the formed gel to devitrification.

BACKGROUND AND SUMMARY OF THE INVENTION

The family of sodipotassic copper tube silicates of the general formula $Na_{2-2x}K_{2x}CuSi_4Ohd\ 10$ (where x is equal to 0, ½, or 1) has three distinct species—these being, a sodium end of the formula $Na_2CuSi_4O_{10}$ (sometimes referred to as the $\alpha$ phase), a potassium end of the formula $K_2CuSi_4O_{10}$ (sometimes referred to as the $\beta$ phase), and an intermediate phase, litidionite (NaKCuSi$_4$O$_{10}$). Of these, litidionite exists in nature (but is even then rare), whereas the $\alpha$ and $\beta$ phases must be synthesized. These sodipotassic copper tube silicates are, in general, comprised of an interconnecting network of Si-O bonds forming long tubes with a high aspect ratio. In this regard, please see Kawamura et al, Bull. Mineral 104, 387-395 (1981), the entire content of which is expressly incorporated hereinto by reference.

Synthesis of all three species of sodipotassic copper tube silicates has been proposed in the past. However, the typical synthesis route for forming these sodipotassic copper tube silicates generally includes melt processing of the reagents. More specifically, sodipotassic copper tube silicates have been synthesized in the past by a technique commonly referred to as "devitrification". This prior technique includes melting oxides of the reagents, pulverizing the cooled melt, followed by annealing over a bed of crystalline litidionite supported by a quartz plate. The product was then typically repulverized and calcined for homogeneity. See generally, Hefter et al, "Synthesis of the Tube Silicate Litidionite and Structural Relationships between It and Some Other Silicates", Inorg. Chem. 21, 2810-2816 (1982).

Sodipotassic copper tube silicates may be usefully employed, for example, as reinforcing media (e.g., due to the silicates' excellent stiffness) so as to form composites with polymers, preceramic and ceramic materials. However, the conventional techniques employed to synthesize these sodipotassic copper tube silicates is not commercially viable since the melt-processing of the oxide reagents is energy intensive. Furthermore, conventional processes require sintering at high temperatures for several days (often for twenty-one days or longer). These constraints imposed by conventional processing techniques are therefore not conducive to producing sodipotassic copper tube silicates on an economically commercial scale.

It is towards providing a commercially viable synthesis route to sodipotassic copper tube silicates that the present invention is directed.

Thus, one aspect of the present invention is that sodipotassic copper tube silicates may be synthesized at relatively low temperatures without first melt processing the oxide reagents (as necessary according to conventional synthesis routes). More specifically, the present invention is concerned with synthesizing sodipotassic copper tube silicates by first forming (at essentially room temperature) a gel of the reagents, and then sintering the formed gel at elevated temperature and for a time sufficient to form crystalline sodipotassic copper tube silicates.

These aspects, and others, will become more clear after careful consideration is given to the following detailed description of the preferred exemplary embodiments thereof.

DETAILED DESCRIPTION OF THE PREFERRED EXEMPLARY EMBODIMENTS

Broadly, the present invention includes forming crystalline species of the sodipotassic copper tube silicate family $Na_{2-2x}K_{2x}CuSi_4O_{10}$ (where x is equal to 0, ½, or 1), by first forming a gel of the reagents.

More specifically, the gel is formed by combining, at low temperature (e.g., between about 25–50° C., preferably about 40° C.), essentially stoichiometric amounts of a copper salt, and at least one salt of potassium and sodium, in an aqueous alcohol solution. The gel is dried (preferably under vacuum) and then subjected to sintering so as to form the crystalline tube silicates.

The copper, potassium and sodium salts are most preferably copper acetate monohydrate, potassium acetate, and sodium acetate.

Sintering of the dried gel is typically carried out at elevated temperatures greater than about 745° C., and most preferably between 745° C. to about 780° C., for about 7 days.

Further understanding of this invention will be obtained by referring to the following non-limiting Examples.

EXAMPLE I

A solution of potassium acetate (3.93 grams, 0.04 mole) in 40 ml of water was added to a flask containing a stirred solution of copper acetate monohydrate (4.02 grams, 0.02 mole) in 80 ml of ethanol while heating the flask contents to 40° C. Tetraethyl orthosilicate (16.67 grams, 0.08 mole) was then added to the mixture while stirring and maintaining the temperature at 40° C. The solution remained clear and pale blue in color after addition of the tetraethyl orthosilicate. 0.5 ml of ammonium hydroxide was then added to the mixture under constant stirring conditions. After addition of the ammonium hydroxide, heating of the mixture was discontinued but stirring of the mixture was continued. In about an hour, the solution started to become turbid. The mixture was stirred overnight during which time the entire mixture gelled to form a bluish cake mass. The flask was rotovapped at reduced pressure to remove excess water and ethanol. The obtained solids were dried thoroughly in a vacuum oven at 90° C. overnight to obtain 12.02 grams of a dried gel. The dried gel was then calcined in a furnace at 750° C. for seven (7) days to obtain 4.97 grams of bluish purple crystals of $K_2CuSi_4O_{10}$ at a yield of 60%. X-ray powder diffraction analysis of the product revealed it to be highly crystalline pure form of $K_2CuSi_4O_{10}$.

EXAMPLE II

Following the procedure of Example I above, a gel was made using the following reagents: 8.04 grams of copper acetate monohydrate, 7.86 grams of potassium acetate, 160 ml of ethanol, 190 ml of water, and 33.34 grams of tetraethyl orthosilicate to obtain 21.78 grams of dried gel. The gel was split into four portions and calcined at different temperatures and time intervals as follows:

A. 780° C. for overnight—Although the sample showed some crystalline peaks corresponding to $K_2CuSi_4O_{10}$, it also had an amorphous background as determined by x-ray powder diffraction analysis.

B. 780° C. for 7 days—X-ray powder diffraction analysis indicated that the product was mostly pure form of crystalline $K_2CuSi_4O_{10}$.

C. 760° C. for 7 days—X-ray powder diffraction analysis indicated that the product was mostly pure form of crystalline $K_2CuSi_4O_{10}$.

D. 750° C. for 7 days—This product appeared to be the purest form of crystalline $K_2CuSi_4O_{10}$ as determined by x-ray powder diffraction analysis.

EXAMPLE III $K_2CuSi_4O_{10}$ was made following the procedure of Example I and using the following reagents: 16.08 grams of copper acetate monohydrate, 15.72 grams of potassium acetate, 320 ml of ethanol, 160 ml of water, and 66.68 grams of tetraethyl orthosilicate. The gel was calcined at 750° C. for 7 days and resulted in a yield of 30.13 grams, 91%. X-ray powder diffraction analysis showed that the product is predominantly pure crystalline $K_2CuSi_4O_{10}$.

EXAMPLE IV $K_2CuSi_4O_{10}$ was made following the procedure of Example I and using the following reagents: 16.08 grams of copper acetate monohydrate, 15.72 grams of potassium acetate, 320 ml of ethanol, 160 ml of water, and 66.68 grams of tetraethyl orthosilicate. The gel was calcined at 750° C. for 7 days and resulted in a yield of 32.34 grams, 98%. X-ray powder diffraction analysis showed that the product is predominantly pure crystalline $K_2CuSi_4O_{10}$.

EXAMPLE V $K_2CuSi_4O_{10}$ was made following the procedure of Example I and using the following reagents: 16.08 grams of copper acetate monohydrate, 15.72 grams of potassium acetate, 320 ml of ethanol, 160 ml of water, and 66.68 grams of tetraethyl orthosilicate. The gel was calcined at 750° C. for 7 days and resulted in a yield of 31.36 grams, 95%. X-ray powder diffraction analysis showed that the product is predominantly pure crystalline $K_2CuSi_4O_{10}$.

EXAMPLE VI $Na_2CuSi_4O_{10}$ was made following the procedure of Example I and using the following reagents: 7.99 grams of copper acetate monohydrate, 6.56 grams of sodium acetate, 160 ml of ethanol, 80 ml of water, and 33.33 grams of tetraethyl orthosilicate. The yield of the gel was 20.95 grams. Two portions each having 5 grams of the gel were calcined at 765° C. and 745° C., respectively, for 7 days. The yield from the portion calcined at 765° C. for 7 days was 2.91 grams and the yield of the portion calcined at 745° C. for 7 days was 3.05 grams. X-ray powder diffraction analysis showed that the product was highly crystalline and predominantly $Na_2CuSi_4O_{10}$.

EXAMPLE VII

Litidionite ($NaKCuSi_4O_{10}$ was prepared following the procedures of Example I above and using the following reagents: 7.99 grams of copper acetate monohydrate, 3.28 grams of sodium acetate, 3.93 grams of potassium acetate, 160 ml of ethanol, 80 ml of water, and 33.33 grams of tetraethyl orthosilicate. The yield of the gel was 21.56 grams. Two portions each having 5 grams of the gel were calcined at 768° C. and 748° C., respectively, for 7 days. The yield from the portion calcined at 768° C. for 7 days was 2.95 grams and the yield of the portion calcined at 748° C. for 7 days was 2.81 grams. X-ray powder diffraction analysis showed that the product was highly crystalline and predominantly litidionite ($NaKCuSi_4O_{10}$)

The above Examples illustrate the reproducibility and the relative low temperatures that may be employed using the sol-gel synthesis of the present invention.

However, while the invention has been described in connection with what is presently considered to be the most practical and preferred embodiment, it is to be understood that the invention is not to be limited to the disclosed embodiment, but on the contrary, is intended to cover various modifications and equivalents thereof included within the spirit and scope of the appended claims.

What is claimed is:

1. A method of synthesizing a crystalline sodipotassic copper tube silicate specie of the family $Na_{2-2x}K_{2x}CuSi_4O_{10}$ where X is 0, ½ or 1, comprising combining, with an organosilicate at essentially room temperature, stoichiometric amounts of a copper salt, and at least one salt of potassium and sodium, in an aqueous alcohol solution to form a gel, and then sintering the gel at a temperature and for a time sufficient to form said crystalline sodipotassic copper tube silicate.

2. A synthesis method as in claim 1, wherein the gel is sintered at a temperature of at least about 745° C. for about seven days.

3. A synthesis method as in claim 1 or 2, wherein said specie is $Na_2CuSi_4O_{10}$.

4. A synthesis method as in claim 1 or 2, wherein said specie is $K_2CuSi_4O_{10}$.

5. A synthesis method as in claim 1 or 2, wherein said specie is $NaKCuSi_4O_{10}$.

6. A synthesis method as in claim 1 or 2, wherein said copper salt is a copper acetate.

7. A synthesis method as in claim 6, wherein said copper acetate is copper acetate monohydrate.

8. A synthesis method as in claim 7, wherein said potassium and sodium salts are each potassium and sodium acetates.

9. A method of synthesizing a crystalline sodipotassic copper tube silicate specie of the family $Na_{2-2x}K_{2x}CuSi_4O_{10}$ where x is 0, ½ or 1, comprising sintering a dried gel which consists essentially of an organosilicate, a copper salt, and at least one salt of potassium and sodium, in essentially stoichiometric amounts, at a temperature and for a time sufficient to form a crystalline specie of said sodipotassic copper tube silicate.

10. A synthesis method as in claim 9, wherein said dried gel is formed by mixing, at essentially room temperature, stoichiometric amounts of said organo silicate, copper salt, and at least one salt of potassium and sodium in an aqueous alcohol solution.

11. A synthesis method as in claim 10, wherein the gel is sintered at a temperature of at least about 745° C. for seven days.

12. A synthesis method as in claim 9 or 10, wherein said specie is $Na_2CuSi_4O_{10}$.

13. A synthesis method as in claim 9 or 10, wherein said specie is $K_2CuSi_4O_{10}$.

14. A synthesis method as in claim 9 or 10, wherein said specie is $NaKCuSi_4O_{10}$.

15. A synthesis method as in claim 9 or 10, wherein said copper salt is a copper acetate.

16. A synthesis method as in claim 15, wherein said copper acetate is copper acetate monohydrate.

17. A synthesis method as in claim 16, wherein said potassium and sodium salts are each potassium and sodium acetates.

* * * * *